(12) United States Patent
Otsubo et al.

(10) Patent No.: US 7,090,714 B2
(45) Date of Patent: Aug. 15, 2006

(54) CERAMIC HONEYCOMB FILTER

(75) Inventors: Yasuhiko Otsubo, Fukuoka-ken (JP); Hirohisa Suwabe, Fukuoka-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 190 days.

(21) Appl. No.: 10/461,419

(22) Filed: Jun. 16, 2003

(65) Prior Publication Data
US 2004/0065068 A1    Apr. 8, 2004

(30) Foreign Application Priority Data
Jun. 17, 2002 (JP) .............................. 2002-175376
Mar. 28, 2003 (JP) .............................. 2003-090560

(51) Int. Cl.
*D01D 46/00* (2006.01)
(52) U.S. Cl. .................. 55/523; 55/282.2; 55/282.3; 55/385.3; 55/482; 55/524; 55/DIG. 10; 55/DIG. 30; 60/311
(58) Field of Classification Search ............... 55/282.2, 55/282.3, 385.3, 482, 483, 484, 486, 523, 55/524, DIG. 10, DIG. 30; 60/311; 428/116, 428/117, 118
See application file for complete search history.

(56) References Cited

U.S. PATENT DOCUMENTS

| | | | | |
|---|---|---|---|---|
| 3,785,781 A | * | 1/1974 | Hervert et al. | 60/299 |
| 3,927,300 A | * | 12/1975 | Wada et al. | 392/502 |
| 4,519,820 A | * | 5/1985 | Oyobe et al. | 55/523 |
| 4,535,589 A | * | 8/1985 | Yoshida et al. | 55/DIG. 30 |
| 5,019,142 A | * | 5/1991 | Waschkuttis | 55/523 |
| 5,318,755 A | * | 6/1994 | Kuivalainen et al. | 55/523 |
| 5,514,347 A | | 5/1996 | Ohashi et al. | |
| 6,391,077 B1 | * | 5/2002 | Kudoh | 55/523 |
| 6,508,852 B1 | * | 1/2003 | Hickman et al. | 55/523 |
| 6,607,804 B1 | * | 8/2003 | Best et al. | 55/523 |
| 6,712,884 B1 | * | 3/2004 | Bruck et al. | 55/523 |
| 6,764,527 B1 | * | 7/2004 | Ishihara et al. | 55/523 |
| 6,776,814 B1 | * | 8/2004 | Badeau et al. | 55/385.3 |
| 2003/0053940 A1 | | 3/2003 | Harada et al. | |

FOREIGN PATENT DOCUMENTS

| | | | |
|---|---|---|---|
| DE | 42 03 128 A | | 8/1992 |
| DE | 42 03 128 A1 | * | 8/1992 |
| DE | 4203128 A1 | | 8/1992 |
| DE | 198 09 976 A1 | * | 9/1999 |
| DE | 19809976 A1 | | 9/1999 |
| EP | 1 132587 A | | 9/2001 |
| JP | 59 028010 A | | 2/1984 |
| JP | 59-126022 | | 7/1984 |
| JP | 04-255513 | | 9/1992 |
| JP | 04-353211 | | 12/1992 |
| JP | 04-353211 A | | 12/1992 |
| JP | 08-012460 | | 1/1996 |
| JP | 11-324651 | | 11/1999 |

* cited by examiner

*Primary Examiner*—Jason M. Greene
(74) *Attorney, Agent, or Firm*—Sughrue Mion, PLLC

(57) ABSTRACT

The ceramic honeycomb filter having a plurality of honeycomb structures each having an outer wall and a large number of flow paths partitioned by cell walls inside the outer wall, which are bonded to each other in the direction of the flow paths, desired flow paths on exhaust gas inlet and outlet sides being sealed, wherein at least one plug on an exhaust inlet side is disposed at a position inside the filter separate from an inlet end surface of the filter; and wherein inlet-side plugs are formed at desired positions of end portions of at least one honeycomb structure.

6 Claims, 7 Drawing Sheets

Fig. 2
(a) Molding 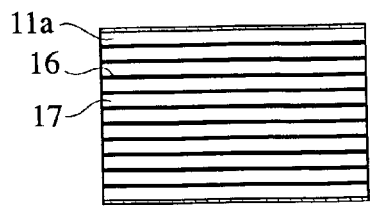
(b) Machining of Peripheral Portion 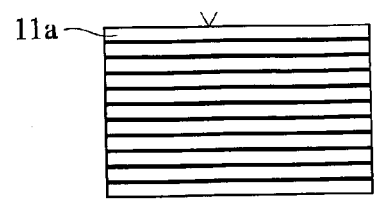
(c) Burning 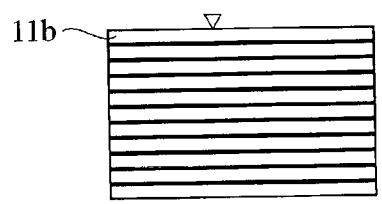
(d) Cutting 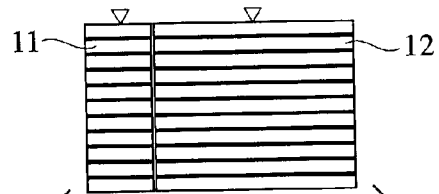
(e) Sealing 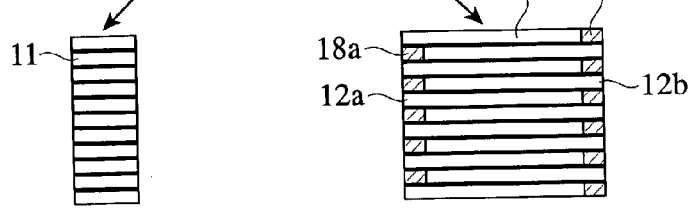
(f) Formation of Bonding Layer 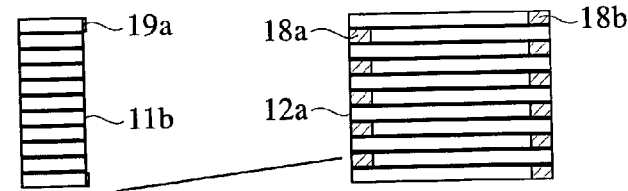
(g) Integral Bonding 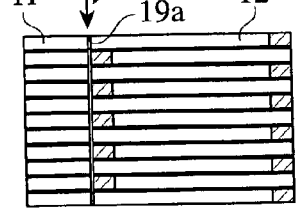
(h) Formation of Outer Wall 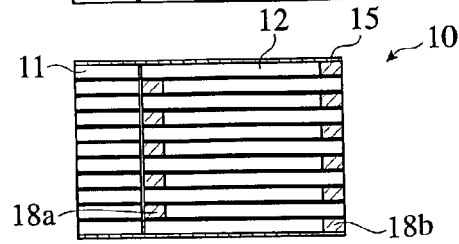

Fig. 5   -- Prior Art --
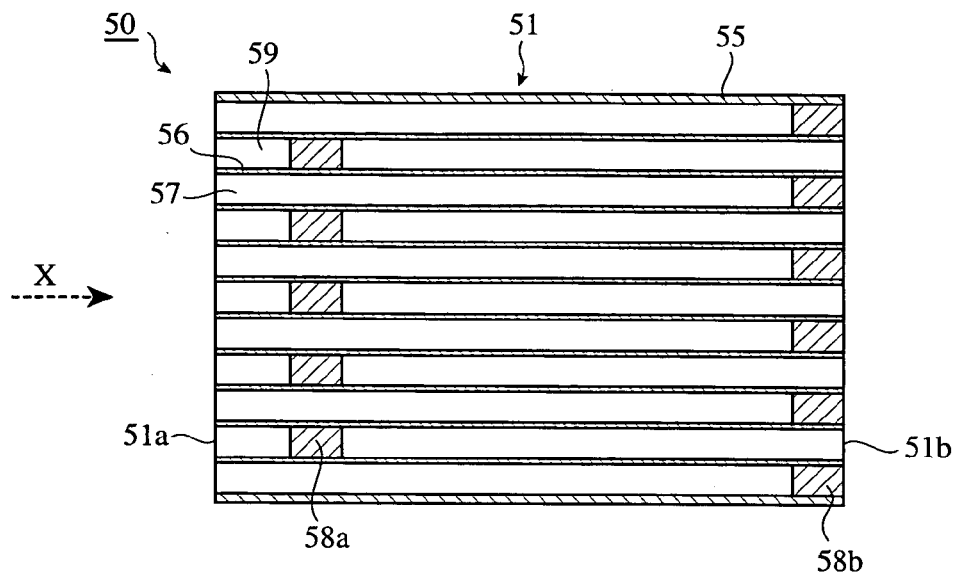
Fig. 6   -- Prior Art --
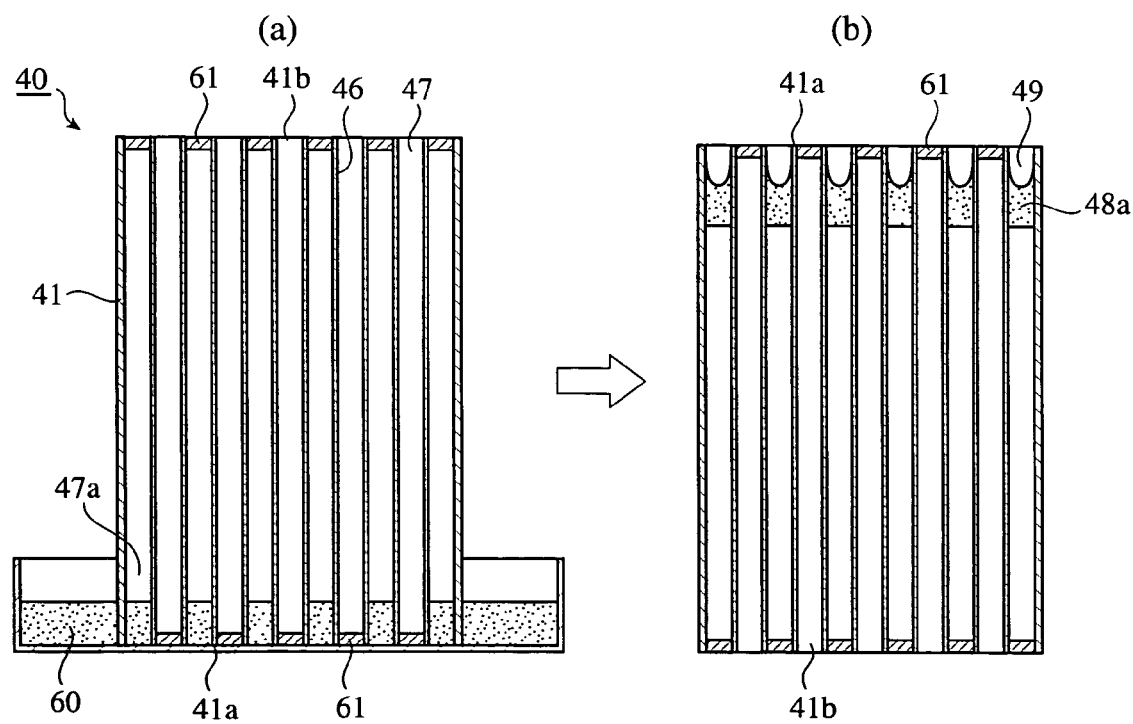

CERAMIC HONEYCOMB FILTER

FIELD OF THE INVENTION

The present invention relates to a ceramic honeycomb filter having excellent efficiency of capturing particulates in an exhaust gas with easy regeneration, particularly to a ceramic honeycomb filter suitable as a filter for capturing particulates in an exhaust gas from a diesel engine.

BACKGROUND OF THE INVENTION

From the aspect of protecting environment not only in regions but also in the entire earth, a ceramic honeycomb filter constituted by a ceramic honeycomb structure having both ends on exhaust gas-introducing and exiting sides sealed alternately, is used to remove carbon-based particulates from an exhaust gas discharged from diesel engines.

FIG. 3 is a cross-sectional view showing a conventional honeycomb filter. In a ceramic honeycomb filter 30 having such structure, an exhaust gas containing particulates flows into flow paths 37 of a honeycomb structure 31 that are open at an inlet 31a of the honeycomb structure 31, passes through cell walls 36 constituted by porous ceramics, and exits from an outlet 31b via adjacent flow paths. During this process, particulates in the exhaust gas are captured by pores (not shown) of the cell walls 36. As particulates are continuously captured in the honeycomb filter 30, the pores of the cell walls 36 are clogged, resulting in drastic decrease in a capturing function and thus increase in a pressure loss. The reduction of an engine output ensues. In view of this, a technology was proposed to burn particulates accumulated in the honeycomb filter 30 by an electric heater, a burner, a microwave-generating means, etc. to regenerate the honeycomb filter 30.

However, when particulates captured in a honeycomb filter having a conventional structure are burned by an electric heater or a burner, only small amounts of particulates are attached in an upstream region, so that heat generated by the burning of particulates is not sufficient to keep the self ignition of the attached particulates, resulting in difficulty in the regeneration of a downstream region. Also, when regeneration is carried out by a microwave system as shown in JP 59-126022 A, for instance, a portion of the filter near the air supply side is cooled by air supplied, so that the temperature elevation of particulates is hindered, resulting in narrowing of a region in which the burning of particulates occurs and thus difficulty in effective regeneration of the entire honeycomb filter. As a result, when air necessary for the burning of particulates is supplied from an exhaust gas inlet side to continuously capture the particulates, unburned particulates are so accumulated near an end surface of the filter that flow paths open on an exhaust gas inlet side are clogged, thereby losing a particulates-capturing function and resulting in extreme decrease in a filter-regenerating function.

To solve these problems, JP 59-28010 A discloses a honeycomb filter having a space disposed between plugs positioned on an exhaust gas inlet side and the end surfaces of flow paths on the exhaust gas inlet side. FIG. 4 is a cross-sectional view showing a honeycomb filter 40 described in JP 59-28010 A. Because the honeycomb filter of FIG. 4 comprises a space 49 between plugs 48a positioned on an upstream side of the flow paths 47 and the end surfaces of inlets 41a of the honeycomb structure 41, particulates in an exhaust gas are captured by partition walls in the space 49, so that larger amounts of particulates are attached near an upstream region. Accordingly, particulates are burned by a heating means mounted on the inlet side of the filter, so that the burning of particulates can be easily conducted in a downstream region.

Japanese Patent 2,924,288 discloses a honeycomb filter-regenerating apparatus comprising a heating chamber mounted onto an exhaust pipe of an engine, a means for generating microwaves that are supplied to the heating chamber, a honeycomb filter contained in the heating chamber for capturing particulates in an exhaust gas, and a means for supplying air to the heating chamber. FIG. 5 is a cross-sectional view showing a honeycomb filter 50 in the honeycomb filter-regenerating apparatus of Japanese Patent 2,924,288. The honeycomb filter 50 is constituted by a honeycomb structure 51 having a large number of flow paths 57 partitioned by cell walls 56 enclosed by an outer wall 55, inlet portions 51a and outlet portions 51b being alternately sealed by plugs 58a, 58b, the plugs 58a being positioned inside the end surfaces of the inlet portion 51a to constitute a heat dissipation-preventing means 59. In this honeycomb filter, when the captured particulates are heated by microwaves, the particulates reach their burning temperature in a short period of time because of the heat dissipation-preventing means 59. Incidentally, the arrow X shows an exhaust gas-flowing direction.

In any of the above ceramic honeycomb filters, as shown in FIGS. 4 and 5, to efficiently regenerate the entire honeycomb filter, plugs on an exhaust gas inlet side are disposed inside the filter separate from an inlet end surface of the filter. It has been found, however, that the actual use of the honeycomb filters having such structures causes the following problems.

As shown in FIG. 6(a), in the honeycomb filter 40 described in JP 59-28010 A, the plugs 48a on the inlet side are formed as follows: First, the end portions of flow paths needing no plugs are sealed with a wax 61, and the inlet end portions 41a of the honeycomb structure 41 are then immersed in the plug-forming slurry 60 to cause the slurry 60 enter into the flow paths 47a not plugged with a wax. Because the honeycomb structure 41 is made of a porous ceramic and thus water-absorptive, an upper portion of the slurry entering into the flow paths 47a is deprived of water by the cell walls and thus solidified, while a lower portion of the slurry remains in the form of a slurry for the lack of the cell walls that can remove water. This honeycomb structure is turned upside down as shown in FIG. 6(b), so that a slurry remaining in the flow paths spontaneously falls onto the solidified slurry portion to form plugs 48a. The position of the inlet-side plugs is determined by the height of the slurry entering into the cells.

However, the actual trial of the inventors to fill the flow paths 47a with the slurry 60 has revealed that because water is absorbed by the cell walls in contact with the slurry regardless of the position of the slurry, solidification starts simultaneously in the upper and lower portions of the slurry. It is thus difficult to cause solidification only in the upper portion of the slurry, and the entire regions of the cells on an upstream side of the inlet-side plugs are likely sealed by the slurry. Accordingly, it is difficult to provide a space as shown in FIGS. 2 and 9–15 of JP 59-28010 A in cell portions on an upstream side of the inlet-side plugs. This tendency is remarkable, for instance, when the inlet-side plugs are disposed at positions separate from the end surface of the ceramic honeycomb by 10 mm or more. Accordingly, this honeycomb filter cannot exhibit functions of capturing particulates and preventing heat dissipation as expected, failing to efficiently carry out the regeneration of the entire filter, and resulting in a large pressure loss.

Also disclosed is a method for integrating ceramic chips inserted into the honeycomb structure as inlet-side plugs 48*a* with cell walls by sintering. However, because it is difficult to make the ceramic chips completely equal to an extrusion-molded honeycomb structure in material properties such as a thermal expansion coefficient, etc., a gap inevitably occurs between the ceramic chip and the cell walls due to thermal expansion and shrinkage accompanying the sintering, making it likely that a particulates-capturing efficiency decreases, that the ceramic chips detaches from the cell walls, and that the cell walls are broken. In addition, even if the ceramic chips are integrated with the cell walls, the ceramic chips (plugs) are likely to detach from the filter by thermal shock when particulates are burned in the filter, because of their difference in a thermal expansion coefficient.

A honeycomb structure used as a particulates-capturing filter usually has an extremely small cell size (cell pitch), for instance, 2.54 mm for 100 cpsi and 1.47 mm for 300 cpsi. Accordingly, it is difficult to embed the ceramic chips in the cells accurately, and when the inlet-side plugs are disposed separate from the end surface of the ceramic honeycomb, for instance, by 10 mm or more, it is difficult to dispose all ceramic chips at proper positions. If the inlet-side plugs were not accurately positioned, a space on an upstream side of the inlet-side plugs would have non-uniform volume, failing to efficiently regenerate the entire honeycomb filter, and resulting in different pressure losses among the filters. With respect to Japanese Patent 2,924,288, it fails to disclose a specific method for forming plugs 58*a* at the inlets 51*a*.

OBJECTS OF THE INVENTION

Accordingly, an object of the present invention is to provide a ceramic honeycomb filter having excellent efficiency of capturing particulates in an exhaust gas with easy regeneration by burning particulates.

DISCLOSURE OF THE INVENTION

The ceramic honeycomb filter according to the first invention comprises a plurality of honeycomb structures each having an outer wall and a large number of flow paths partitioned by cell walls inside the outer wall, which are bonded to each other in the direction of the flow paths, desired flow paths on exhaust gas inlet and outlet sides being sealed, wherein at least one plug on an exhaust gas inlet side is disposed at a position inside the filter separate from an inlet end surface of the filter; and wherein inlet-side plugs are formed at desired positions of end portions of at least one honeycomb structure.

In a preferred embodiment of the first invention, a first honeycomb structure and a second honeycomb structure each having an outer wall and a large number of flow paths partitioned by cell walls inside the outer wall are bonded to each other in the direction of the flow paths with the first honeycomb structure on an upstream side, and the flow paths of the second honeycomb structure are sealed in desired portions on exhaust gas inlet and outlet sides.

The ceramic honeycomb filter according to the second invention comprises at least one honeycomb structure having an outer wall and a large number of flow paths partitioned by cell walls inside the outer wall, and at least one plug member having desired flow paths, the honeycomb structure and the plug member being bonded to each other in the direction of the flow paths.

In a preferred embodiment of the second invention, the ceramic honeycomb filter comprises first and second honeycomb structures each having an outer wall and a large number of flow paths partitioned by cell walls inside the outer wall; a first plug member having desired flow paths and disposed between an exit-side end of the first honeycomb structure and an inlet-side end of the second honeycomb structure, such that the flow paths of the first plug member are aligned with those of the first and second honeycomb structures; and a second plug member having desired flow paths and bonded to an exit-side end of the second honeycomb structure, such that the flow paths of the second plug member are aligned with those of the second honeycomb structure.

The term "inlet side" or "exhaust gas-introducing side" used herein means a side on which an exhaust gas flows into the honeycomb filter, and the term "outlet side" or "exhaust gas-exiting side" used herein means a side on which an exhaust gas exits from the honeycomb filter. Also, the term "direction of flow paths" used herein means a longitudinal direction of flow paths in each honeycomb structure.

BRIEF DESCRIPTION OF THE DRAWINGS

FIG. 1(*b*) is a schematic cross-sectional view showing the ceramic honeycomb filter of Example 2;

FIG. 1(*c*) is a schematic cross-sectional view showing the ceramic honeycomb filter of Example 3;

FIG. 1(*d*) is a schematic cross-sectional view showing the ceramic honeycomb filter of Example 4;

FIG. 1(*e*) is a side view of FIG. 1(*a*);

FIG. 2 is a schematic cross-sectional view showing the steps of producing the ceramic honeycomb filter of Example 1;

FIG. 5 is a schematic cross-sectional view showing a honeycomb filter in a honeycomb filter-regenerating apparatus described in Japanese Patent 2,924,288;

FIG. 6 is a schematic cross-sectional view showing a method for forming plugs in a honeycomb filter described in JP 59-28010 A;

FIG. 7(*b*) is a partially broken side view showing another example of the ways of bonding a plurality of honeycomb structures in the ceramic honeycomb filter of the present invention;

FIG. 7(*c*) is a partially broken side view showing a further example of the ways of bonding a plurality of honeycomb structures in the ceramic honeycomb filter of the present invention;

FIG. 7(*d*) is a partially broken side view showing a still further example of the ways of bonding a plurality of honeycomb structures in the ceramic honeycomb filter of the present invention;

DESCRIPTION OF THE PREFERRED EMBODIMENTS

Figure 1A:
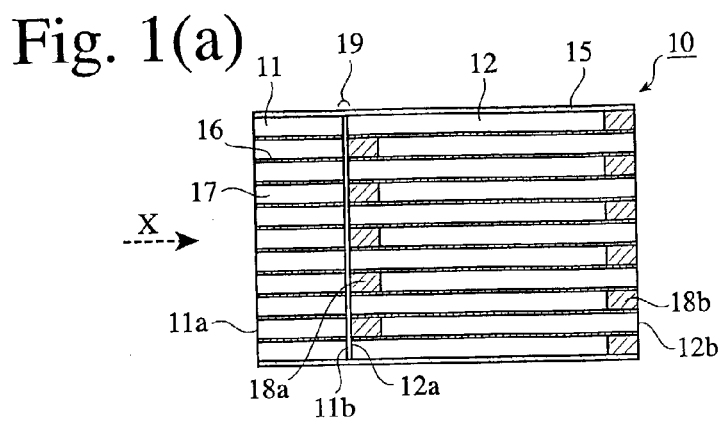
FIG. 1(*a*) is a schematic cross-sectional view showing the ceramic honeycomb filter of Example 1.
Figure 1E:
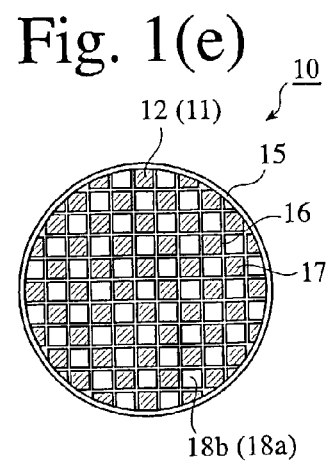
Figure 1B:
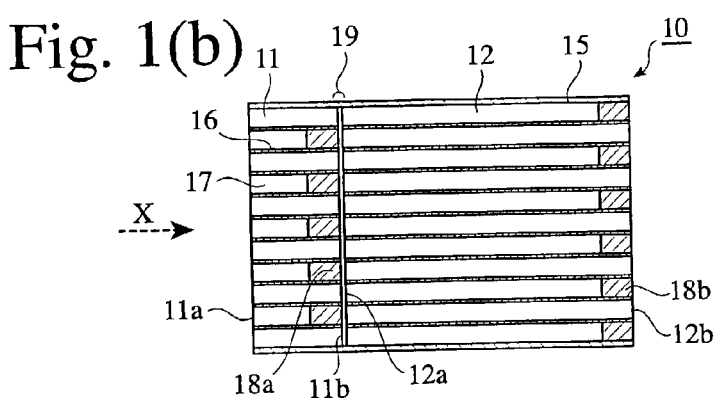

In the ceramic honeycomb filter of the first invention, as shown in FIGS. 1(a) and 1(b), for instance, the honeycomb structures 11 and 12 are bonded to each other in the flow path direction, at least one plug 18a on an exhaust gas inlet side being disposed at a position inside the filter separate from an inlet end surface of the filter, and plugs on the inlet side being formed at desired positions of end portions of at least one honeycomb structure. The distance between the inlet-side plugs 18a and an inlet end surface of the filter is preferably 10 mm or more. The honeycomb filter having such structure can be produced by bonding honeycomb structures each having plugs at desired positions of end portions in the direction of the exhaust gas flow paths.

Referring to FIG. 6, the formation of plugs at desired positions of end portions of a honeycomb structure can be carried out by the following procedure. After attaching a masking film (not shown) to each end surface of an inlet portion 41a and an outlet portion 41b of a honeycomb structure 41 with an adhesive, the masking film is provided with apertures in a checkerboard pattern. An end of the inlet portion 41a is then immersed in a slurry 60 of a plugs material having the same composition as that of the honeycomb structure 41 to cause the slurry 60 to penetrate into cells through the apertures, thereby forming the inlet-side plugs 48a. Similarly, an end portion of the outlet portion 31b is immersed in the plug material slurry 60 to form plugs 48b on an exhaust gas-exiting side. Thereafter, by drying, a heat treatment, burning, etc. if necessary, the plugs 48a, 48b are integrated with the honeycomb structure. The plug material slurry 60 penetrating into pores of the cell walls are solidified, and the plugs 48a, 48b and the cell walls made of the same material are integrated with each other by burning, resulting in the plugs 48a, 48b strongly bonded to the cell walls at desired positions of end portions of the honeycomb structure. Thus, because the honeycomb filter of the present invention shown in FIGS. 1(a) and (b) can be produced by bonding conventional honeycomb structures each having plugs in one or both end positions in the flow path direction, the plugs and the cell walls are strongly bonded to each other, and the distance of the inlet-side plugs from the inlet-side end surface of the honeycomb filter can be set precisely, despite that the plugs on the exhaust gas inlet side are disposed inside the filter separate from the inlet-side end surface. Accordingly, the honeycomb filter surely provided with a space on an upstream side of the inlet-side plugs can easily be obtained.

In the ceramic honeycomb filter of the present invention shown in FIG. 1(a), inlet-side and outlet-side plugs are formed at desired positions of the inlet and outlet portions of the second honeycomb structure. Namely, the first honeycomb structure 11 having no plugs and the second honeycomb structure 12 provided with plugs 18a, 18b at desired positions of the inlet and outlet portions are bonded to each other. The ceramic honeycomb filter having the structure shown in FIG. 1(a) can have accurate distance between the inlet-side end surface 11a and the inlet-side end surfaces of the inlet-side plugs 18a than the structure shown in FIG. 1(b), resulting in a more accurate space on an upstream side of the inlet-side plugs 18a.

Figure 1C:
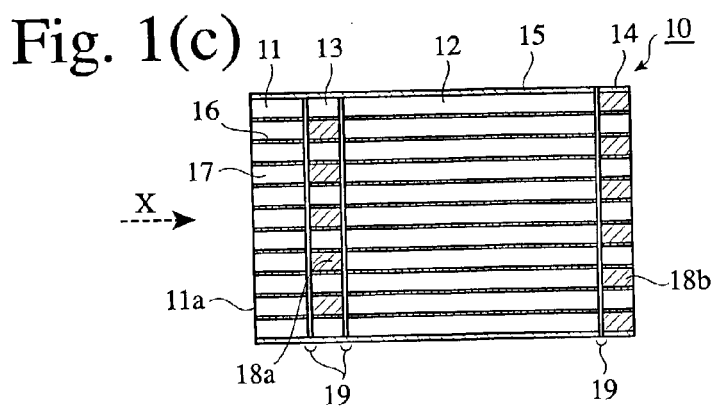

As shown in FIG. 1(c), for instance, the ceramic honeycomb filter of the second invention has a structure in which two honeycomb structures 11 and 12 each having a large number of flow paths 17 partitioned by cell walls 16 inside the outer wall 15, and plug members 13 and 14 each having desired flow paths formed in advance are bonded to each other, such that their flow paths are communicated with each other. With the plug members 13, 14 disposed between a plurality of honeycomb structures, the distance between the end surface 11a of the honeycomb filter and the inlet-side end surfaces of the inlet-side plugs 18a can be secured with higher accuracy. As a result, the honeycomb filter in which space is surely provided on an upstream side of the inlet-side plugs, and the plugs and the cell walls 16 are strongly bonded to each other, can be easily obtained. Incidentally, plugs on an exhaust gas-exiting side need not be formed by the plug member, but may be formed in the honeycomb structure by the conventional methods.

Usable as the plug members are those having the same outer structures as those of the honeycomb structures with desired flow paths, or honeycomb structures having a large number of flow paths partitioned by cell walls inside the outer wall with plugs formed in the desired flow paths.

The bonding of a plurality of honeycomb structures in a flow path direction includes not only the bonding of honeycomb structures such that their cell walls are brought into contact with each other via a bonding layer on their flow path end surfaces, but also various bonding structures as shown, for instance, in FIG. 7. Any of FIGS. 7(a)–(f) shows an embodiment in which a first honeycomb structure 11 and a second honeycomb structure 12 having plugs formed on both of exhaust gas-introducing and -exiting sides are bonded to each other in the flow path direction. Incidentally, a gap is exaggerated in FIGS. 7(a)–(f) for explanation. Specifically, FIG. 7(a) shows an embodiment in which honeycomb structures are bonded to each other via a bonding layer 19a on end surfaces of their outer walls 15; FIG. 7(b) shows an embodiment in which honeycomb structures are bonded to each other via a bonding layer 19a on their outer walls 15 and several partition walls; FIG. 7(c) shows an embodiment in which honeycomb structures 11, 12 are bonded to each other by abutting their flow path end surfaces and integrally forming outer walls 15 on both honeycomb structures 11, 12; FIG. 7(*d*) shows an embodiment in which honeycomb structures 11, 12 are bonded to each other via a bonding layer 19*a* abutting their outer walls 15 and bonding members 19*b* inserted into opposing flow paths; FIG. 7(*e*) shows an embodiment in which both honeycomb structures 11, 12 are bonded to each other by forming a bonding layer 19*a* on a periphery and integrally forming outer walls 15 on both honeycomb structures 11, 12; and FIG. 7(*f*) shows an embodiment in which a the honeycomb structure 11 and a the honeycomb structure 12 having both ends of flow paths in a peripheral portion sealed are bonded to each other via a bonding layer 19*a* in a peripheral portion, by integrally forming outer walls 15 on both honeycomb structures 11, 12.

To be used as a filter for removing particulates from an exhaust gas from a diesel engine, the ceramic honeycomb filter of the present invention is preferably made of materials having excellent heat resistance, specifically ceramic materials comprising as main components at least one selected from the group consisting of cordierite, alumina, mullite, silicon nitride, carbon nitride and LAS. Among them, the ceramic honeycomb filter made of cordierite is most preferable because it is inexpensive and excellent in heat resistance and corrosion resistance with a low thermal expansion.

Though not particularly restrictive, materials constituting a layer for bonding a plurality of honeycomb structures in the flow path direction are preferably heat-resistant inorganic materials. This is because the temperature of the honeycomb filter is elevated to about 600–800° C. by heat generated by burning the accumulated particulates, making heat resistance necessary for the bonding layer. Usable as the heat-resistant inorganic bonding materials are ceramic particles with which inorganic binders are mixed, if necessary. The ceramic particles secure heat resistance, and the inorganic binders act to strongly bond the honeycomb structures.

The above ceramic particles are preferably made of the same materials as those of the honeycomb structures. A ceramic honeycomb filter obtained by bonding a plurality of honeycomb structures with a bonding material comprising ceramic particles having the same composition has improved heat resistance, with little thermal stress due to the difference in thermal expansion between the honeycomb structures and the bonding material even though it is exposed to an high-temperature exhaust gas, thereby being free from cracking from the bonding layer. The ceramic particles contained in the heat-resistant, inorganic bonding material, which may have the same composition as that of the honeycomb structure, are ceramic particles made, for instance, of cordierite, alumina, mullite, silicon nitride, carbon nitride, etc. Powder obtained by pulverizing the honeycomb structure may be used as the ceramic particles having the same material as that of the honeycomb structure. Because a bonding material composed of powder obtained by pulverizing the honeycomb structure is not different from the honeycomb structure at all in properties, particularly a thermal expansion coefficient, the thermal stress can be made extremely small when exposed to a high-temperature exhaust gas, thereby completely preventing cracking in the bonding layer.

Though not particularly restrictive, the inorganic binder contained in the heat-resistant, inorganic bonding material may be alumina cement, colloidal silica, colloidal alumina, water-glass, etc. Because these inorganic binders exhibit bonding power by drying, no heat treatment is required after drying, making it possible to easily provide a ceramic honeycomb filter constituted by honeycomb structures strongly bonded in the flow path direction. Of course, a heat treatment may be carried out, if necessary. A particularly preferable inorganic binder comprises silicon dioxide having a small thermal expansion coefficient as a main component. The use of the bonding material containing a silicon dioxide binder provides strong bonding power at room temperature, with a minimum thermal stress due to the difference in thermal expansion between the honeycomb structure and the bonding material when exposed to a high-temperature exhaust gas, thereby surely preventing cracking from occurring in the bonded portions.

The heat-resistant, inorganic bonding material may contain ceramic fibers, organic binders, etc., if necessary, in addition to the above ceramic particles and inorganic binder.

The bonding layer is preferably formed radially in a range of 2–10 mm from the outer wall on the bonding surface of the honeycomb structure. When the ceramic honeycomb filter is mounted on a diesel engine vehicle, it is fixed in a metal container with holding members. To prevent deviation in a flow path direction when the filter is contained in the metal container, flow paths near the outer wall are gripped with holding members, such that both end surfaces of the filters are pressed by the holding members in the flow path direction. For this purpose, the flow paths near the outer wall have a structure that does not permit an exhaust gas to flow. Accordingly, by forming a bonding layer on the bonding surface of the honeycomb structure in a region (radially in a range of 2–10 mm from the outer wall), in which an exhaust gas does not flow, the honeycomb structures can be strongly bonded to each other without lowering exhaust gas-cleaning capability. When the range of the bonding layer is radially less than 2 mm from the outer wall, a bonding area is too small to obtain sufficient bonding power. On the other hand, when the range of the bonding layer is radially more than 10 mm from the outer wall, the bonding material is likely to intrude into the flow paths for an exhaust gas, resulting in increased pressure loss and decreased exhaust gas-cleaning capability.

The ceramic honeycomb filter of the present invention is preferably provided with an outer wall on its outer surface by coating. The outer wall coated onto the outer surface of the ceramic honeycomb filter improves the bonding strength of the honeycomb structures. Also, when an outer wall is coated after removing a peripheral portion of the honeycomb structure by machining, the outer wall has improved precision in an outer diameter, and the honeycomb filter has improved strength because curved cell walls, etc., which may exist in a peripheral portion, can be removed. The removal of the peripheral portion may be conducted at any stage before or after a plurality of honeycomb structures are bonded, and it may be conducted on, for instance, either of a dried honeycomb-shaped extrudate or a honeycomb-shaped burned body.

When a plurality of honeycomb structures are bonded to each other in the flow path direction, particularly when the honeycomb structures are bonded to each other via a bonding layer in peripheral portions of their end surfaces, an extremely small gap may be provided between the end surfaces of cell walls in center portions of the honeycomb structure end surfaces. For instance, FIG. 1(*b*) shows an embodiment in which the honeycomb structure 11 having flow paths sealed on an exhaust gas-exiting end and the honeycomb structure 12 having flow paths sealed on an exhaust gas-exiting end are bonded to each other via a bonding layer on outer walls on flow path end surfaces, and FIG. 8(*b*) is an enlarged view showing their bonded portions. In this embodiment, a gap 20 corresponding to the thickness of the bonding layer 19*a* is provided. The gap 20 is preferably 3 mm or less, more preferably 1 mm or less, further preferably ½ or less of the cell pitch of the honeycomb structure. When the gap 20 is as large as more than 3 mm, particulates in an exhaust gas are likely to exit through the gap 20, resulting in decrease in a particulates-capturing rate.

Figure 8A:
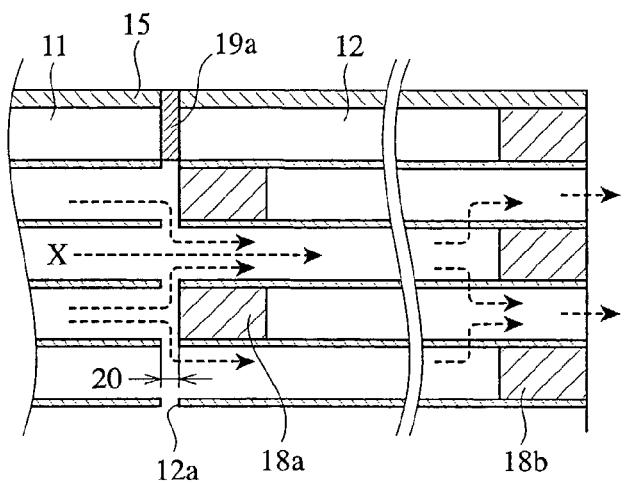
FIG. 8(a) is a partial cross-sectional view showing one example of portions bonding a plurality of honeycomb structures in the ceramic honeycomb filter of the present invention.
Figure 8B:
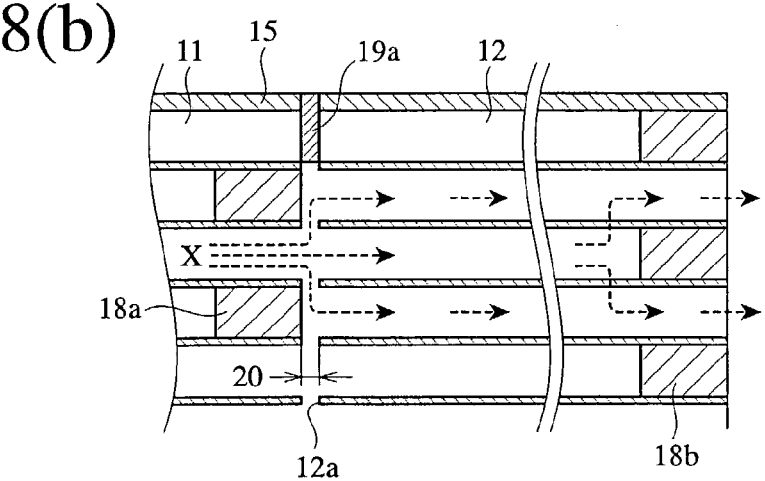
FIG. 8(b) is a partial cross-sectional view showing another example of portions bonding a plurality of honeycomb structures in the ceramic honeycomb filter of the present invention.
Figure 8C:
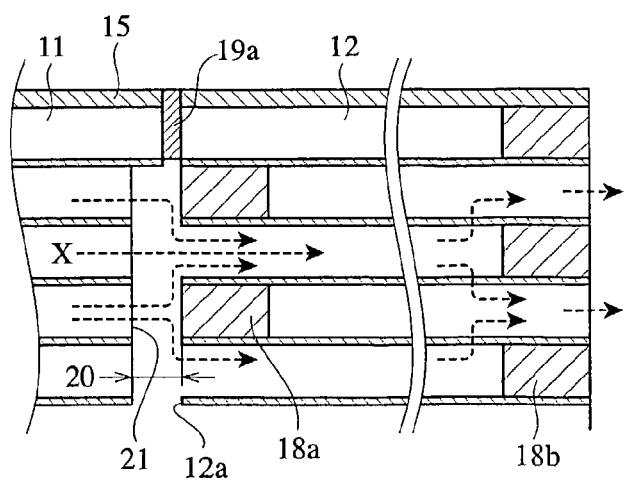
FIG. 8(c) is a partial cross-sectional view showing a further example of portions bonding a plurality of honeycomb structures in the ceramic honeycomb filter of the present invention.

FIG. 1(a) shows an embodiment in which the honeycomb structure 11 having no plugs and the honeycomb structure 12 having plugs formed on both ends are bonded to each other via a bonding layer in peripheral portions of their end surfaces, and FIG. 8(a) is an enlarged view showing their bonded portions. In this embodiment, too, a gap 20 corresponding to the thickness of the bonding layer 19a is provided. However, because the honeycomb structure 12 disposed on an exhaust gas-exiting side is provided with plugs at both ends, particulates are not discharged from the gap 20. Accordingly, there is no decrease in a particulates-capturing rate due to the gap 20. However, because the pressure loss of the ceramic honeycomb filter may be affected by the gap 20 depending on its size, the gap 20 is preferably 20 mm or less, more preferably 10 mm or less in this embodiment. With respect to the lower limit of the gap 20, because the size of the gap 20 correlates with the thickness of the bonding layer 19a, the gap 20 is preferably 0.1 mm or more, more preferably 0.2 mm or more, further preferably 0.5 mm or more. What is needed to provide a gap 20 of 0.1 mm or more, for instance, is only to make the bonding layer 19a as thick as 0.1 mm or more. However, because a thicker bonding layer 19a provides a lower thermal shock resistance, a large gap 20 may be provided without making the bonding layer 19a thicker. As shown in FIG. 8(c), for instance, the honeycomb structure 11 having no plugs may be provided with a recess in a center portion of an exhaust gas-exiting end surface to provide a step 21, so that the bonding layer 19a is thinner than the gap 20.

Figure 1D:
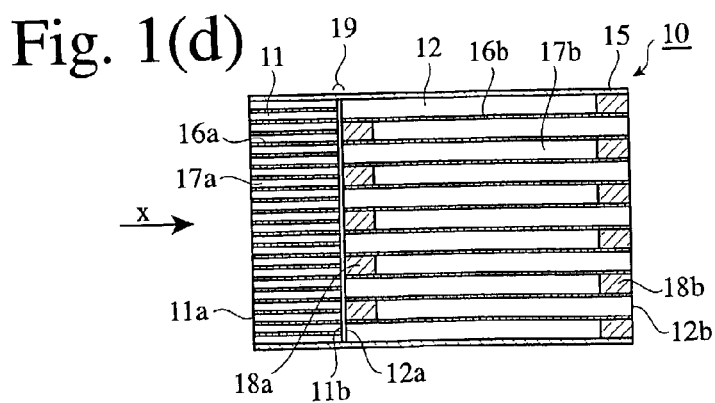
Figure 3:
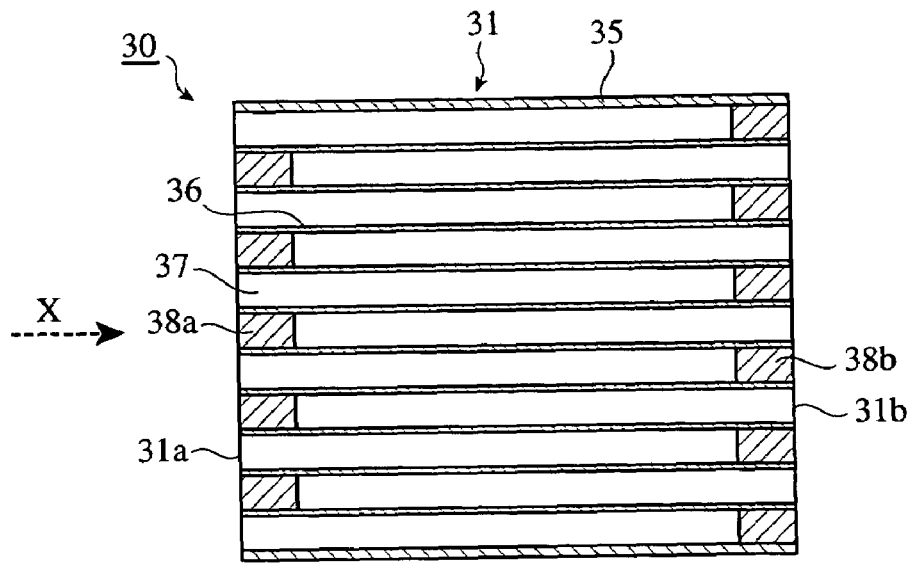
FIG. 3 is a schematic cross-sectional view showing one example of conventional honeycomb filters.
Figure 4:
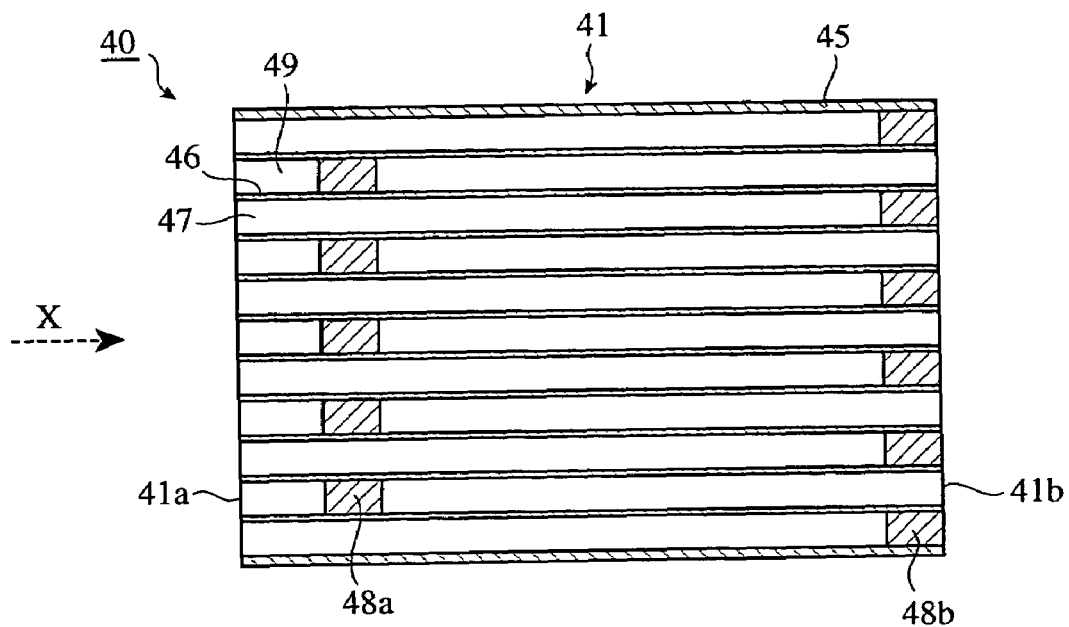
FIG. 4 is a schematic cross-sectional view showing a honeycomb filter described in JP 59-28010 A.
Figure 7A:
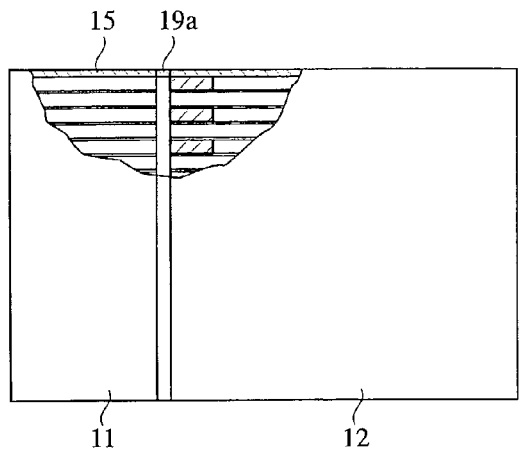
FIG. 7(*a*) is a partially broken side view showing one example of the ways of bonding a plurality of honeycomb structures in the ceramic honeycomb filter of the present invention.
FIG. 7(e) is a partially broken side view showing a still further example of the ways of bonding a plurality of honeycomb structures in the ceramic honeycomb filter of the present invention.
FIG. 7(f) is a partially broken side view showing a still further example of the ways of bonding a plurality of honeycomb structures in the ceramic honeycomb filter of the present invention.
Figure 7B:
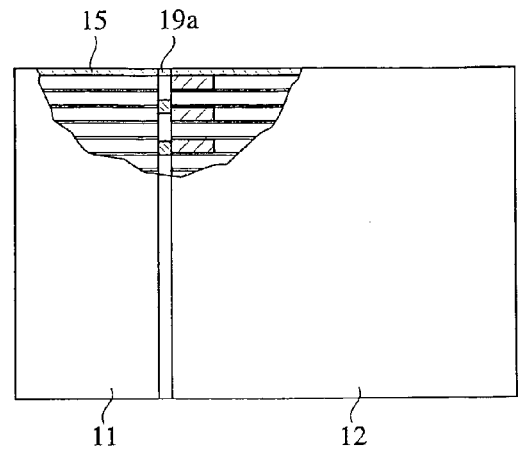
Figure 7C:
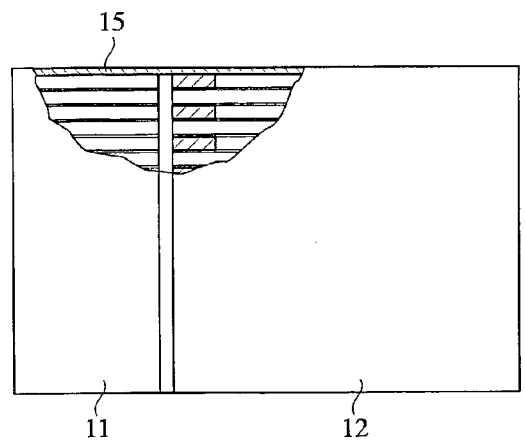
Figure 7D:
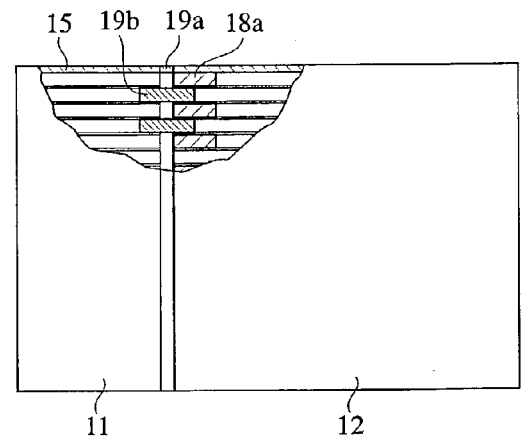
Figure 7E:
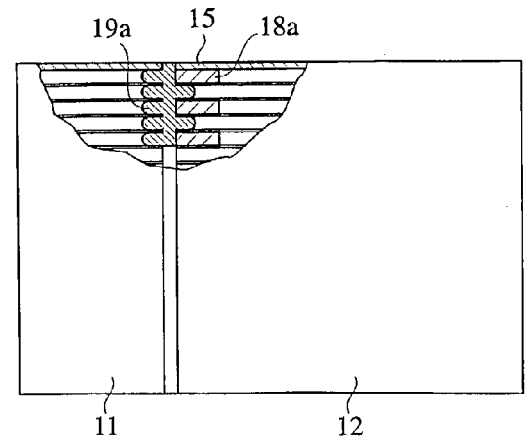
Figure 7F:
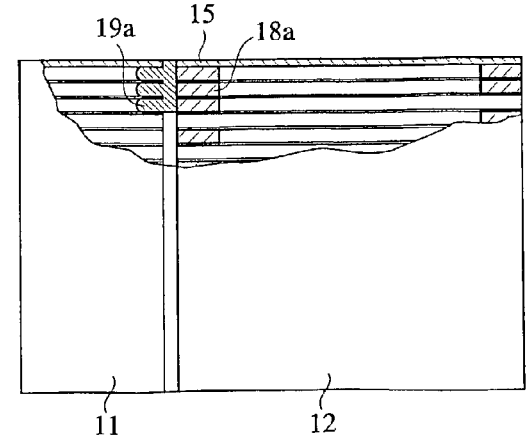

A plurality of honeycomb structures used in the ceramic honeycomb filter of the present invention may not have the same number of flow paths per a unit area. As shown in FIG. 1(d), for instance, when the honeycomb structure 11 having no plugs and the honeycomb structure 12 having plugs at both ends are bonded with the honeycomb structure 11 on an upstream side, the honeycomb structure 11 may have a larger number of flow paths per a unit area than the honeycomb structure 12. In the case of such a structure, plugs are formed in both end portions of the honeycomb structure 12 on a downstream side, so that particulates are unlikely discharged without being captured, and that an exhaust gas flow is rectified by the honeycomb structure 11 having a larger number of flow paths, resulting in a low pressure loss in the ceramic honeycomb filter. In the case of FIG. 1(d), the cell walls of the honeycomb structure 11 on an upstream side of the inlet-side plugs have a large surface area carrying a large amount of a catalyst, resulting in high efficiency of burning particulates.

A plurality of honeycomb structures used in the ceramic honeycomb filter of the present invention may not have the same length in a flow path direction. Particularly, a honeycomb structure disposed on an exhaust gas inlet side is shorter than a honeycomb structure disposed on an exhaust gas-exiting side in a flow path direction. This makes the honeycomb structure on an exhaust gas-exiting side longer in the flow path direction, thereby making wider the cell walls, through which an exhaust gas penetrates, and thus resulting in a smaller pressure loss in the ceramic honeycomb filter.

Figure 9A:
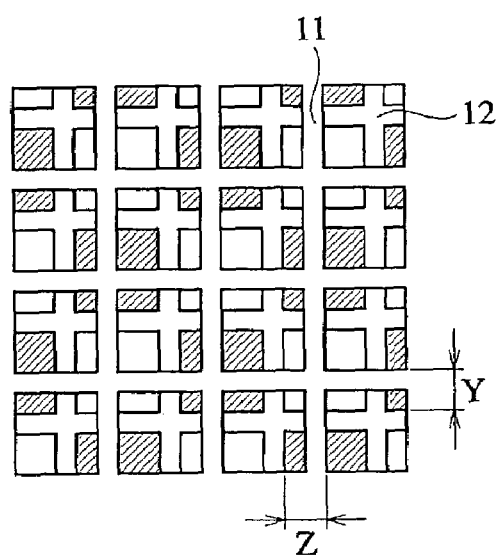
FIG. 9(a) is a schematic view showing one example of portions bonding a plurality of honeycomb structures in the ceramic honeycomb filter of the present invention, when viewed from the exhaust gas inlet side.
Figure 9B:
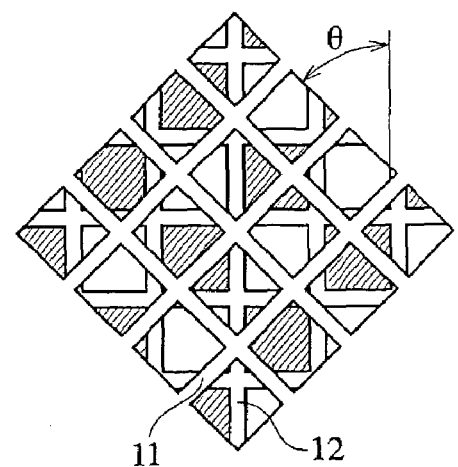
FIG. 9(b) is a schematic view showing another example of portions bonding a plurality of honeycomb structures in the ceramic honeycomb filter of the present invention, when viewed from the exhaust gas inlet side.

The positions of flow paths need not be aligned completely among a plurality of honeycomb structures. FIGS. 9(a) and 9(b) respectively show the relation in the positions of the flow paths between the first honeycomb structure 11 and the second honeycomb structure 12 having plugs formed on flow path ends, which are taken by viewing the bonded portions of both honeycomb structures from the exhaust gas inlet side. In the embodiment of FIG. 9(a), the flow paths of both honeycomb structures 11, 12 are deviated by Y and Z in directions perpendicular to the cell walls. In the embodiment of FIG. 9(b), the flow paths of the first honeycomb structure 11 and the second honeycomb structure 12 are slanted by an angel of θ. Of course, the flow paths of a plurality of honeycomb structures constituting the ceramic honeycomb filter of the present invention may be in a relation of relative positions obtained by combining FIGS. 9(a) and 9(b).

With a catalyst carried on the cell wall surfaces of a plurality of honeycomb structures constituting the ceramic honeycomb filter of the present invention, the efficiency of burning particulates can be improved. With a larger amount of a catalyst or a more active catalyst on the inlet side on which the exhaust gas temperature is higher, the efficiency of burning particulates can also be improved.

The present invention will be explained in further detail by the following Examples without intention of restricting the present invention thereto.

EXAMPLE 1

FIG. 1(a) is a longitudinal cross-sectional view showing the ceramic honeycomb filter 10 of Example 1, FIG. 1(e) is a side view thereof, and FIG. 8(a) is an enlarged cross-sectional view showing the bonded portions of a plurality of honeycomb structures. This ceramic honeycomb filter 10 is made of cordierite, having an outer diameter of 267 mm, a length of 304.5 mm, a cell wall thickness of 0.3 mm, a cell wall pitch of 1.5 mm, a porosity of 65% in the cell walls 16, and an average pore diameter of 22 µm. The first honeycomb structure 11 having a large number of flow paths 17 partitioned by the cell walls 16 and the second honeycomb structure 12 are bonded to each other in the direction of the flow paths 17. With the inlets and outlets of the flow paths 17 for an exhaust gas (shown by the arrow X) alternately sealed by plugs 18a, 18b, an exhaust gas is caused to flow from the first honeycomb structure 11 to the second honeycomb structure 12. the inlet-side plugs 18a are formed on the end surfaces of the inlet portions 12a of the second honeycomb structure 12. The first honeycomb structure 11 and the second honeycomb structure 12 are bonded to each other via a bonding layer 19a comprising cordierite particles and an inorganic binder near the outer walls 15, and a gap 20 is provided in front of the inlet-side plugs 18a.

The production of this ceramic honeycomb filter 10 will be illustrated referring to FIG. 2. In FIG. 2, (a) shows a green body 11' having a honeycomb structure; (b) shows a green body 11' whose peripheral portion is removed by machining; (c) shows a honeycomb structure 11" obtained by burning the green body 11', from which the peripheral portion is removed; (d) shows first and second honeycomb structures 11, 12 obtained by cutting the honeycomb structure 11" in a direction perpendicular to the flow paths 17; (e) shows the first honeycomb structure 11 and the second honeycomb structure 12 provided with plugs 18a, 18b; (f) shows the honeycomb structure 11 having a bonding layer 19a formed near a peripheral portion on an exit-side end, and the second honeycomb structure 12 having no bonding layer, (g) shows the first and second honeycomb structures 11, 12 integrally bonded to each other via the bonding layer 19a; and (h) shows a honeycomb filter 10 obtained by coating the bonded first and second honeycomb structures 11, 12 with an outer wall 15 in their peripheral portions.

(a) Molding

Kaolin powder, talc powder, fused silica powder, aluminum hydroxide powder, alumina powder, etc. are used to produce a cordierite-forming material powder. Methyl cellulose as a molding aid, and graphite and an organic foaming agent as pore-forming agents are added to the cordierite-forming material powder in proper amounts. After mixing sufficiently in a dry state, the predetermined amount of water is added, and the resultant mixture is sufficiently blended to form a ceramic slurry. The ceramic slurry is extruded through an extrusion die, to form a green body 11' having a honeycomb structure integrally comprising an outer wall and cell walls, which has a large number of flow paths 17 partitioned by the cell walls 16 inside the outer wall. The green body 11' is dried in an induction-drying furnace, etc.

(b) Machining of Peripheral Portion

The outer wall and part of the cell walls near it are removed from the green body 11' by a cylindrical grinder (not shown), to produce a honeycomb-structured green body 11' having grooves extending in a longitudinal direction on an outer surface. Incidentally, the machining of an outer surface may be carried out on a burned body in place of the green body.

(c) Burning

The green body 11' is burned at a maximum temperature of 1410° C. for about 8 days. In this Example, the burned honeycomb structure 11" had an outer diameter of 265 mm, a length of 320 mm, a wall thickness of 0.3 mm, a cell wall pitch of 1.5 mm, a porosity of 65% in cell walls, and an average pore diameter of 22 μm.

(d) Cutting

After the honeycomb structure 11" provided with a positioning mark is cut in a direction perpendicular to the flow paths, the cut surface is ground. In this Example, a 100-mm-long first honeycomb structure 11 and a 204-mm-long second honeycomb structure 12 are obtained.

(e) Sealing

After attaching a masking film (not shown) to each of end surfaces of the inlet and outlet portions 12a, 12b of the second honeycomb structure 12 with an adhesive, the masking film is perforated in a checkerboard pattern. The inlet portion 12a is immersed in a plug material slurry to cause the plug material slurry to flow into the flow paths through the apertures of the masking film, thereby forming inlet-side plugs 18a. Similarly, the outlet portion 12b is immersed in the plug material slurry to form plugs 18b on an exhaust gas-exiting side. The second honeycomb structure 12 provided with the plugs 18a, 18b are dried and burned, such that the plugs 18a, 18b are integrated with the second honeycomb structure 12. When the plugs are made of the same material as that of the honeycomb structures 11, 12, unburned green bodies corresponding to the honeycomb structures 11, 12 are provided with plugs, and both green bodies bonded to each other are burned, so that the formation of the plugs and the bonding of the honeycomb structures 11, 12 can be carried out simultaneously.

(f) Formation of Bonding Layer

A bonding layer 19a is formed on the first honeycomb structure 11 on an exhaust gas-exiting side 11b near an outer surface radially in a range of 2–10 mm from the outer wall. In this Example, used as a material forming the bonding layer 19a was a mixture of 30 parts by mass of cordierite powder (average diameter: 20 μm) having the same composition as that of the honeycomb structure, and 100 parts by mass of an inorganic binder slurry containing 85% by mass of silicon dioxide powder.

(g) Integral Bonding

With pins inserted into several flow paths of the honeycomb structures 11, 12, the honeycomb structures 11, 12 are abutted to each other via a bonding layer 19a such that the corresponding flow paths are aligned, and then press-bonded with the positioning marks aligned. In this state, they are dried (in the case of unburned bodies, burning is further carried out), so that both of them are integrated with each other. In this Example, the honeycomb structures 11, 12 had a gap 20 of 0.5 mm.

(h) Formation of Outer Wall

Outer surfaces of the honeycomb structures 11, 12 integrally bonded to each other are coated with an outer wall material comprising cordierite aggregate and an inorganic binder, which is hardened to form an outer wall 15 common to both of the honeycomb structures 11, 12. In this Example, the coating material was a mixture of 100 parts by mass of cordierite particles having an average diameter of 10 μm, 7 parts by mass of colloidal silica, methyl cellulose and water, in a paste form. Incidentally, after removing outer surface portions from the honeycomb structures 11, 12 integrally bonded in the step (g) by machining, the outer wall 15 may be formed.

Easily obtained by thus bonding a pair of the honeycomb structures 11, 12 integrally in the direction of the flow paths 17 is a honeycomb filter having a size of an outer diameter of 267 mm, a length of 304.5 mm, a cell wall thickness of 0.3 mm, a cell wall pitch of 1.5 mm, and a structure in which plugs on an exhaust gas inlet side are disposed inside the filter separate from an inlet end surface of the filter, and a space is surely provided on an upstream side of the inlet-side plugs. According to the method of the present invention, the honeycomb filter, in which the length of plugs 18a and the position of the plugs 18a from the inlet end can be accurately controlled with the plugs and the cell walls strongly bonded to each other, can be easily obtained.

In Example 1, a burned honeycomb structure obtained from an extrudate is cut, and the cut portions are bonded again. However, a ceramic honeycomb filter having the same structure as in Example 1 can also be obtained by bonding burned honeycomb structures 11, 12 obtained from different green bodies by the same method as above.

EXAMPLE 2

FIG. 1(*b*) schematically shows the ceramic honeycomb filter 10 of Example 2. In this ceramic honeycomb filter 10, the inlet-side plugs 18a are formed on the end surface of the outlet portion 11b of the first honeycomb structure 11, and plugs 18b on an exhaust gas-exiting side are formed on the end surface of the outlet portion 12b of the second honeycomb structure 12. Each plug can be formed by conventional methods. By bonding such honeycomb structures 11, 12 in the direction of the flow paths 17, a ceramic honeycomb filter can be easily obtained, in which the inlet-side plugs 18a are disposed inside the ceramic honeycomb filter separate from an inlet end surface of the filter, and the distance of the inlet-side plugs 18a from the inlet-side end surface is accurately set, with the plugs and the cell walls strongly bonded to each other. In this honeycomb filter, a space can surely be provided on an upstream side of the inlet-side plugs 18a.

EXAMPLE 3

FIG. 1(c) schematically shows the honeycomb filter 10 of Example 3. In this honeycomb filter 10, the inlet-side plugs 18a are formed in a plug member 13 bonded between the first honeycomb structure 11 and the second honeycomb structure 12. Also, plugs 18b on an exhaust gas-exiting side are formed in a plug member 14 bonded to the outlet end surface of the second honeycomb structure 12.

By bonding both honeycomb structures 11, 12 having such structures and the plug member 13 in the direction of the flow paths 17, the length of the plug member 13 providing the inlet-side plugs 18a and the position of the plug member 13 from the inlet end surface can be accurately set, and a space can surely be provided on an upstream side of the inlet-side plugs 18a. Because the plug member 13 and the honeycomb structures 11, 12 are formed separately, it is easy to produce a honeycomb filter by bonding these honeycomb structures.

EXAMPLE 4

FIG. 1(d) schematically shows the ceramic honeycomb filter 10 of Example 4. This honeycomb filter 10 has the same structure as that of the honeycomb filter 10 of Example 1, except that the number of flow paths 17a per a unit area in the first honeycomb structure 11 is 4 times the number of flow paths 17b per a unit area in the second honeycomb structure 12. With this structure, a honeycomb filter having a space surely formed on an upstream side of the inlet-side plugs 18a can easily be obtained. In addition, because an exhaust gas flow is rectified by a large number of flow paths in the first honeycomb structure 11, the generation of a disturbed flow is reduced in the ceramic honeycomb filter, resulting in decrease in a pressure loss. Further, the first honeycomb structure 11 can have a larger surface area than the honeycomb structure 11 of Example 1, resulting in a larger catalyst-carrying area, such that the burning of particulates can be effectively conducted.

As described above in detail, because the ceramic honeycomb filter of the present invention has a structure in which plugs on an exhaust gas inlet side are disposed inside the filter separate from an inlet end surface of the filter preferably by 10 mm or more, a space for capturing particulates is surely provided on an upstream side of the inlet-side plugs, resulting in high efficiency of capturing and burning particulates in an exhaust gas. In addition, because the ceramic honeycomb filter of the present invention is obtained by bonding a plurality of honeycomb structures having plugs on end surfaces in the flow path direction, the length and position of the plugs are accurate in the filter. Because the honeycomb structures having plugs on end surfaces can easily be formed by conventional methods, the ceramic honeycomb filter of the present invention can be produced at a low cost by combining these honeycomb structures.

Because the ceramic honeycomb filter of the present invention having the above structure can be regenerated efficiently, suffering from only a small pressure loss, it is suitable as a filter for capturing particulates in an exhaust gas from a diesel engine.

What is claimed is:

1. A ceramic honeycomb filter comprising a plurality of honeycomb structures each having a large number of flow paths partitioned by cell walls; wherein said honeycomb structures are bonded with said flow paths in communication with each other; wherein desired flow paths on an exhaust gas inlet side and an exhaust gas outlet side are sealed by plugs; wherein plugs on the exhaust gas inlet side are disposed at positions inside said filter separate from an inlet end surface of said filter; and wherein adjacent honeycomb structures are bonded to each other via a bonding layer formed near an outer peripheral wall of said filter.

2. A ceramic honeycomb filter comprising a first honeycomb structure and a second honeycomb structure each having a large number of flow paths partitioned by cell walls; wherein said first honeycomb structure and said second honeycomb structure are bonded to each other with said first honeycomb structure on an upstream side, such that said flow paths in said first honeycomb structure and said second honeycomb structure are in communication with each other; wherein the flow paths of said second honeycomb structure are sealed by plugs in desired portions on an exhaust gas inlet side and on an exhaust gas outlet side of said second honeycomb structure; and wherein said first honeycomb structure and second honeycomb structure are bonded to each other via a bonding layer formed near an outer peripheral wall of said filter.

3. A ceramic honeycomb filter comprising a first honeycomb structure and a second honeycomb structure each having a large number of flow paths partitioned by cell walls; wherein said first honeycomb structure and said second honeycomb structure are bonded to each other with said first honeycomb structure on an upstream side, such that said flow paths in said first honeycomb structure and said second honeycomb structure are in communication with each other, wherein the flow paths of said first honeycomb structure are sealed by plugs in desired portions on an exhaust gas outlet side of said first honeycomb structure; wherein the flow paths of said second honeycomb structure are sealed by plugs in desired portions on the exhaust gas outlet side of said second honeycomb structure; and wherein said first honeycomb structure and said second honeycomb structure are bonded to each other via a bonding layer formed near an outer peripheral wall of said filter.

4. The ceramic honeycomb filter according to claim 1, wherein the bonded honeycomb strictures are coated with an outer wall.

5. The ceramic honeycomb filter according to claim 2, wherein the bonded honeycomb structures are coated with an outer wall.

6. The ceramic honeycomb filter according to claim 3, wherein the bonded honeycomb structures are coated with an outer wall.

* * * * *